US007237382B2

(12) United States Patent
Muramatsu et al.

(10) Patent No.: US 7,237,382 B2
(45) Date of Patent: Jul. 3, 2007

(54) CONTROL SYSTEM FOR GAS-TURBINE ENGINE

(75) Inventors: Hironori Muramatsu, Wako (JP); Yukinobu Sugitani, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 201 days.

(21) Appl. No.: 11/090,099

(22) Filed: Mar. 28, 2005

(65) Prior Publication Data

US 2005/0217273 A1     Oct. 6, 2005

(30) Foreign Application Priority Data

Mar. 31, 2004   (JP) ............................. 2004-106421

(51) Int. Cl.
*F02C 9/28*      (2006.01)
(52) U.S. Cl. ...................................... 60/773; 60/39.281
(58) Field of Classification Search ............... 60/39.24, 60/39.281, 773, 791, 792
See application file for complete search history.

(56) References Cited

U.S. PATENT DOCUMENTS 5,775,089 A * 7/1998 Skarvan ....................... 60/773
5,775,090 A * 7/1998 Skarvan ....................... 60/773
6,513,333 B2 * 2/2003 Sugitan ....................... 60/773

FOREIGN PATENT DOCUMENTS

JP         06-213005        8/1994

* cited by examiner

*Primary Examiner*—L. J. Casaregola
(74) *Attorney, Agent, or Firm*—Squire, Sanders & Dempsey L.L.P.

(57) ABSTRACT

In the gas-turbine engine control system having a first control inputting the outputs of sensors and controlling supply of fuel to the engine based on at least one of the inputted outputs, the first control channel includes a comparator inputting the outputs generated by the sensors and comparing change rates of the outputs with corresponding threshold values once every predetermined time period, and a transient/steady-state discriminator discriminating that the engine is in a transient state when the number of the outputs found to be equal to or greater than the corresponding threshold values are equal to or greater than a predetermined value, while discriminating that the engine is in a steady state when the number of times that the outputs are found to be smaller than the threshold values is more than half of number of comparison time. With this, it becomes possible to discriminate whether the engine is in a steady state or in a transient state including acceleration, without being affected by noise or the like.

8 Claims, 10 Drawing Sheets

LOGIC OF THREE-VALUE COMPARISON

FIG. 6

| | COMPARISON RESULTS | DISCRIMINATION | | SIGNAL TO BE USED | ABNORMAL SIGNAL |
|---|---|---|---|---|---|
| A① | A=B, A=C, B=C | ALL OK | Case1 | A | |
| A② | A=B, A=C, B≠C | A IS MOST RELIABLE | Case1 | A | |
| A③ | A=B, A≠C, B=C | B IS MOST RELIABLE | Case1 | B | |
| A④ | A=B, A≠C, B≠C | C IS NG | Case2 | A | C |
| A⑤ | A≠B, A=C, B≠C | C IS MOST RELIABLE | Case1 | C | |
| A⑥ | A≠B, A=C, B≠C | B IS NG | Case2 | A | B |
| A⑦ | A≠B, A≠C, B=C | A IS NG | Case2 | B | A |
| A⑧ | A≠B, A≠C, B≠C | DISCRIMINATION IMPOSSIBLE | Case3 | FROZEN | A, B, C |

LOGIC OF FOUR-VALUE COMPARISON

FIG. 9

| | COMPARISON RESULTS | DISCRIMINATION | | SIGNAL TO BE USED | ABNORMAL SIGNAL |
|---|---|---|---|---|---|
| A① | A=D, B=D, C≠D | D IS MOST RELIABLE C IS NG | Case1 | D | C |
| A② | A=D, B≠D, C=D | D IS MOST RELIABLE B IS NG | Case1 | D | B |
| A③ | A=D, B≠D, C≠D | B, C ARE NG | Case2 | A | B, C |
| A④ | A≠D, B=D, C=D | D IS MOST RELIABLE A IS NG | Case1 | D | A |
| A⑤ | A≠D, B=D, C≠D | A, C ARE NG | Case2 | B | A, C |
| A⑥ | A≠D, B≠D, C=D | A, B ARE NG | Case2 | C | A, B |
| A⑦ | A≠D, B≠D, C≠D | DISCRIMINATION IMPOSSIBLE | Case3 | FROZEN | A, B, C, D |

CONTROL SYSTEM FOR GAS-TURBINE ENGINE

BACKGROUND OF THE INVENTION

1. Field of the Invention

This invention relates to a control system for a gas-turbine engine, more specifically a control system for a gas-turbine aeroengine used in aircraft.

2. Description of the Related Art

In gas-turbine engine control, it is necessary to discriminate whether the engine is in transient condition or in steady state condition and to conduct fuel supply control in response to the determination. Japanese Laid-open Patent Application No. Hei 6(1994)-213005 teaches a technique that discriminates a rapid deceleration from change rate of the low-pressure turbine speed and conducts the fuel supply control by calculating a desired value of the high-pressure turbine speed and the like in response thereto, so as to avoid fan stall (so-called "surge") that is likely to occur when the engine operating condition shifts from the steady state to the rapid deceleration state.

However, this prior art only discriminates the shifting from the steady state to the rapid deceleration state based on the change rate of the low-pressure turbine speed and does not discriminate the transient state including acceleration more generally.

SUMMARY OF THE INVENTION

An object of this invention is therefore to overcome the aforesaid problem and to provide a control system for a gas-turbine engine which can accurately discriminate whether the engine is in transient state including acceleration or in steady state.

In order to achieve the object, the present invention provides a system for controlling a gas-turbine engine having two turbines including at least a low-pressure turbine and a high-pressure turbine, comprising: at least one speed sensor generating an output indicative of a rotational speed of the low-pressure turbine; at least one speed sensor generating an output indicative of a rotational speed of the high-pressure turbine; a temperature sensor generating an output indicative of a temperature of exhaust gas exiting the low-pressure turbine; and a first control channel inputting the outputs of the sensors and controlling supply of fuel to the engine based on at least one of the inputted outputs; wherein the first control channels includes: a comparator inputting the outputs generated by the sensors and comparing change rates or difference of the outputs with corresponding threshold values once every predetermined time period; and a transient/steady-state discriminator discriminating that the engine is in a transient state when number of the outputs found to be equal to or greater than the corresponding threshold values are equal to or greater than a predetermined value, while discriminating that the engine is in a steady state when number of times that the outputs are found to be smaller than the corresponding threshold values is more than half of number of comparison time.

BRIEF DESCRIPTION OF THE DRAWINGS

FIG. 6 is a diagram used to explain selection of a signal usable as a control signal based on the result of the three-value comparison of FIG. 5 and concomitant acceptability determination for checking whether the signal is abnormal;

FIG. 9 is a diagram used to explain selection of a signal usable as a control signal based on the result of the four-value comparison of FIG. 8 and concomitant acceptability determination for checking whether the signal is abnormal.

DETAILED DESCRIPTION OF THE PREFERRED EMBODIMENT

Control system for a gas-turbine engine according to preferred embodiment of this invention will now be explained with reference to the drawings.

Figure 1:
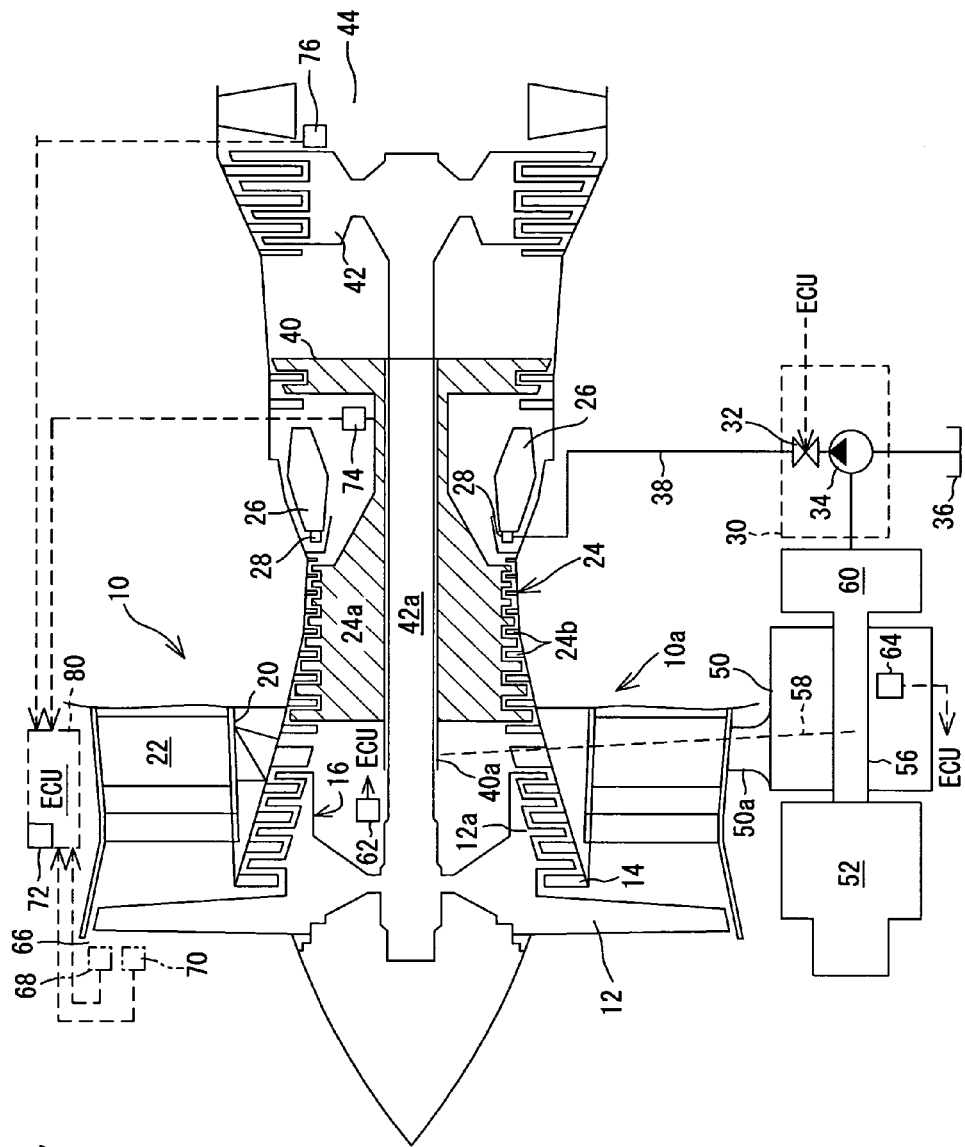
FIG. 1 is an overall schematic view of a control system for a gas-turbine engine according to an embodiment of this invention.

FIG. 1 is an overall schematic view of a control system for a gas-turbine engine according to an embodiment of this invention.

The explanation will be made taking a gas-turbine aeroengine for aircraft as an example of the gas-turbine engine. Four types of gas-turbine aeroengines are commonly used in aircraft: the turbojet engine, turbofan engine, turboprop engine and turboshaft engine. A two-spool (shaft) turbofan engine will be taken as an example in the following explanation.

In FIG. 1, reference numeral 10 designates a turbofan engine (gas-turbine engine; hereinafter referred to as "engine"). Reference numeral 10a designates its main engine unit. The engine 10 is mounted at an appropriate location of an airframe (not shown). The engine 10 is equipped with a fan 12 (rotor blades) that sucks in air while rotating rapidly. A rotor 12a is formed integrally with the fan 12. The rotor 12a and a stator 14 facing it together form a low-pressure compressor 16 that compresses the sucked-in air and pumps it rearward.

A duct (bypass) 22 is formed in the vicinity of the fan 12 by a separator 20. Most of the air pulled in passes through the duct 22 to be jetted rearward of the engine without being burned at a later stage (in the core). The force of the air accelerated rearward by the fan produces a force of reaction that acts on the aircraft (not shown) as a propulsive force (thrust). Most of the propulsion is produced by the air flow from the fan.

The air compressed by the low-pressure compressor 16 flows rearward to a high-pressure compressor 24 where it is further compressed by a rotor 24a and a stator 24b and then flows rearward to a combustion chamber 26.

The combustion chamber 26 is equipped with fuel nozzles 28 that are supplied with pressurized fuel metered by an FCU (Fuel Control Unit) 30. The FCU 30 is equipped with a fuel metering valve 32. Fuel pumped by a fuel pump (gear pump) 34 from a fuel tank 36 located at an appropriate part of the airframe is metered by the fuel metering valve 32 and supplied to the fuel nozzles 28 through a fuel supply line 38.

The sprayed fuel is mixed with compressed air exiting the high-pressure compressor 24 and the mixture is burned after being ignited at engine starting by an exciter (not shown in FIG. 1) and a spark plug (not shown). Once the air-fuel mixture begins to burn, the air-fuel mixture composed of compressed air and fuel is continuously supplied and burned.

The hot high-pressure gas produced by the combustion is sent to a high-pressure turbine 40 and rotates the high-pressure turbine 40 at high speed. The high-pressure turbine 40, more specifically its rotor, is connected to the rotor 24a of the high-pressure compressor 24 by a high-pressure turbine shaft 40a. The rotor 24a is therefore also rotated.

After driving the high-pressure turbine 40, the hot high-pressure gas is sent to a low-pressure turbine 42, which rotates at relatively low speed. The low-pressure turbine 42, more precisely its rotor, is connected to the rotor 12a of the low-pressure compressor 16 through a low-pressure turbine shaft 42a. The rotor 12a and the fan 12 are therefore also rotated. The high-pressure turbine shaft 40a and the low-pressure turbine shaft 42a are provided in a dual coaxial structure.

The hot high-pressure gas passing through the low-pressure turbine 42 (the turbine exhaust gas) is mixed with the air stream passing through the duct 22 without compression or combustion and the combined flow is jetted rearward of the engine through a jet nozzle 44.

An accessory drive gearbox (hereinafter referred to as "gearbox") 50 is attached through a stay 50a to the undersurface at the front end of the main engine unit 10a. An integrated starter/generator (hereinafter called "starter") 52 is attached to the front of the gearbox 50. The FCU 30 is located at the rear of the gearbox 50.

The engine 10 is started by operating the starter 52 to rotate a shaft 56. The rotation is transmitted to the high-pressure turbine shaft 40a through a drive shaft 58 (and a gear mechanism including a bevel gear etc.; not shown) so as to pull in air needed for combustion.

The rotation of the shaft 56 is also transmitted to a PMA (Permanent Magnet Alternator) 60 and the high-pressure fuel pump 34. The fuel pump 34 is therefore driven to spray fuel from the fuel nozzles 28 as explained above. The resulting air-fuel mixture is ignited to start combustion.

When the engine 10 reaches self-sustaining operating speed, the rotation of the high-pressure turbine shaft 40a is transmitted back through the drive shaft 58 (and the gear mechanism including the bevel gear etc.) to the shaft 56 to drive the fuel pump 34 and also drive the PMA 60 and the starter 52. The PMA 60 therefore generates electricity and the starter 52 supplies power to equipment in and on the airframe (not shown).

An N1 sensor (speed sensor) 62 installed near the low-pressure turbine shaft 42a of the engine 10 outputs a signal proportional to the speed of the low-pressure turbine (speed of the low-pressure turbine shaft 42a) N1. An N2 sensor (speed sensor) 64 installed near the shaft 56 outputs a signal proportional to the speed of the high-pressure turbine (speed of the high-pressure turbine shaft 40a) N2. Thus, the N1 sensor 62 and the N2 sensor 64 are installed at or near the engine 10 and each generate an output indicative of the speed of the turbine.

A T1 sensor (temperature sensor) 68 and a P1 sensor (pressure sensor) 70 installed near an air intake 66 at the front of the main engine unit 10a output signals proportional to the temperature T1 and the pressure P1 of the inflowing air at that location. A P0 sensor (pressure sensor) 72 installed inside an ECU (Electronic Control Unit) explained below outputs a signal proportional to atmospheric pressure P0 acting on the engine 10. A temperature sensor (not shown) provided inside the ECU outputs a signal proportional to the temperature of the ECU.

A P3 sensor (pressure sensor) 74 installed downstream of the rotor 24a outputs a signal proportional to the output pressure P3 of the high-pressure compressor 24. An EGT sensor (temperature sensor) 76 installed at an appropriate location downstream of the low-pressure turbine 42 outputs a signal proportional to the exhaust gas temperature EGT (temperature of the exhaust gas exiting the low-pressure turbine 42). Thus, the EGT sensor 76 is installed at the engine and generates an output indicative of a temperature of exhaust gas exiting the turbine.

The aforementioned ECU (designated by reference numeral 80) is incorporated at an upper end position of the main engine unit 10a. The outputs of the sensors mentioned above are sent to the ECU 80.

Figure 2:
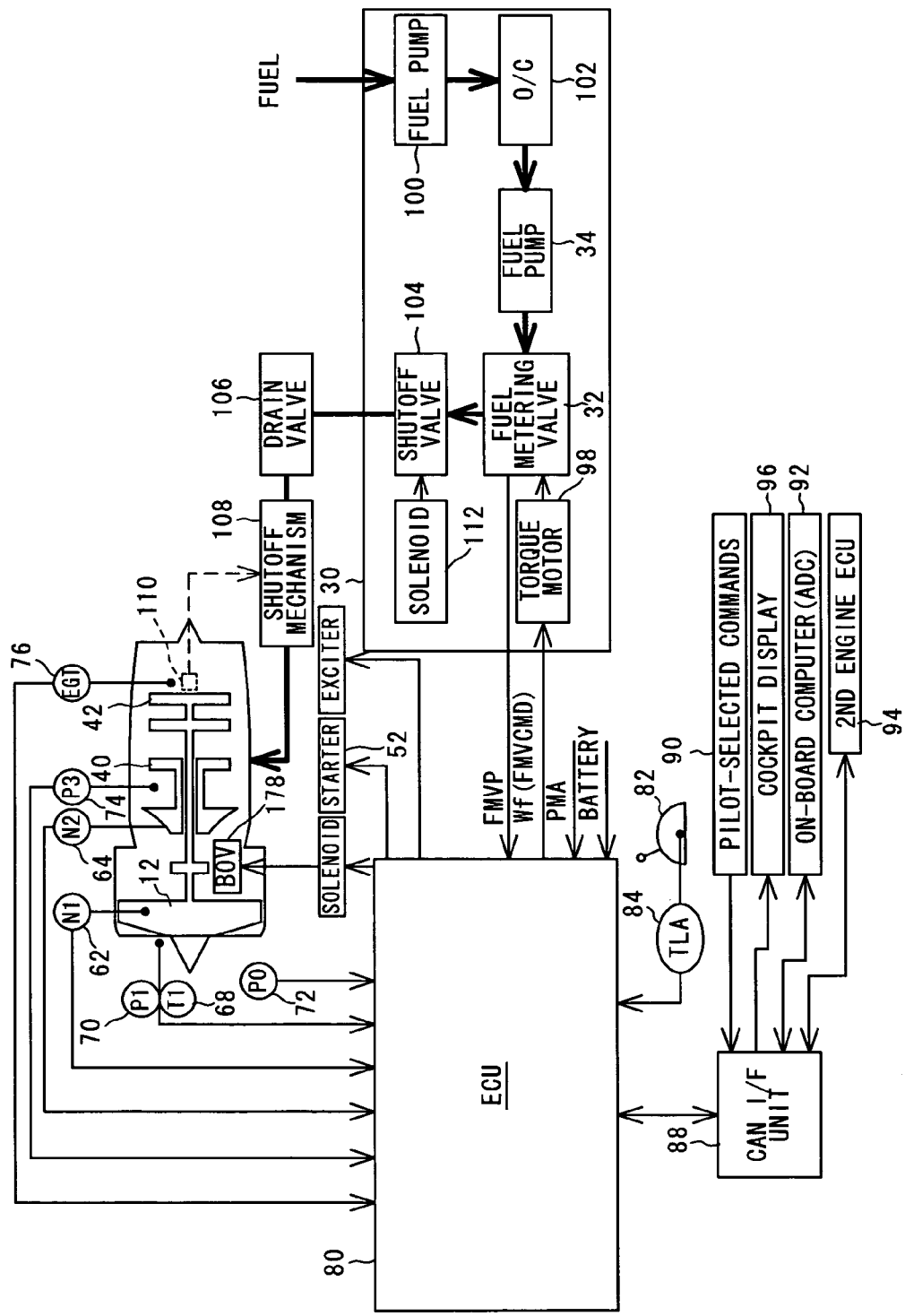
FIG. 2 is a block diagram used to explain the structures of an ECU and an FCU in the system shown in FIG. 1.

The ECU 80 and the FCU 30 are illustrated in the block diagram of FIG. 2, with the overall configuration of the FCU 30 being shown in detail.

In addition to the group of sensors set out above, a TLA (thrust lever angle) sensor 84 installed near a thrust lever (throttle lever) 82 provided near the pilot's seat (cockpit; not shown) outputs a signal proportional to the thrust lever angle or position TLA set or inputted by the pilot (corresponding to the pilot desired thrust). The output of the TLA sensor 84 is also forwarded to the ECU 80. In FIG. 2, and also in FIG. 3 discussed later, the sensors (P0 sensor, TLA sensor etc.) are indicated by the symbols for the parameters they detect (P0, TLA etc.).

An FMVP sensor (valve position sensor; not shown in FIG. 2) installed at an appropriate location in the FCU 30 outputs a signal proportional to the valve position FMVP of the fuel metering valve 32. The output of the FMVP sensor is also forwarded to the ECU 80.

The ECU 80 is also connected with a CAN (Control Area Network) communications interface unit 88 through which it receives (or sends) pilot-selected commands 90 from devices other than the thrust lever 82, data from an on-board computer (Air Data Computer or ADC) 92 (e.g., Mach number Mn, (pressure) altitude ALT and outside air temperature (total air temperature TAT and (absolute) surface air temperature SAT)) and data from an ECU 94 of a second engine (not shown). The data in the ECU 80 are sent through the communications interface unit 88 to be displayed on a display 96 located in the cockpit.

The ECU 80 is activated once every 10 msec (millisecond) to perform operating condition (i.e., transient/steady-state) discrimination and sensor output acceptability determination based on the inputted values and, once every 40 msec, calculates a command value (control input or manipulated variable) Wf for controlling the quantity of fuel to be supplied to the engine 10 (fuel flow rate), in response to the thrust lever position TLA (pilot desired thrust), so as to decrease the difference between the low-pressure turbine shaft speed (low-pressure turbine speed) N1 and a desired speed N1com. The calculated command value Wf is sent to the FCU 30 as an energizing current command value for a torque motor 98.

The ECU 80 monitors whether or not the detected values of the low-pressure turbine speed N1 and a high-pressure turbine speed N2 exceeds corresponding limit values (e.g., values set to 107% of the respective maximum speeds). When either of the detected low-pressure turbine speed N1 and the high-pressure turbine speed N2 exceeds the limit value, the ECU 80 makes an overspeed discrimination and then determines and sends to the FCU 30 the torque motor 98 energizing current command value for reducing the fuel flow rate to the engine 10 to a predetermined value, specifically to zero or a minimal value.

In addition, the ECU 80 determines the command value Wf to regulate the flow rate of fuel to the engine 10 so as to decrease the difference between the change rate N2 dot of the detected high-pressure turbine speed N2 (derivative of N2; acceleration/deceleration factor) and a desired acceleration/deceleration factor N2 dotcom. Specifically, the ECU 80 determines an energizing current command value for the torque motor 98 and sends it to the FCU 30.

The FCU 30 is equipped with a low-pressure fuel pump 100 that pumps fuel from the fuel tank 36 (not shown in FIG. 2) and supplies it to the high-pressure (fuel) pump 34 through a filter (and oil cooler) 102. The high-pressure pump 34 raises the fuel to a high pressure and supplies it to the fuel metering valve 32. The fuel metering valve 32 is connected with the torque motor 98 that sets its spool position. The flow rate of the fuel pressurized by the fuel pump 34 is therefore adjusted (metered) by the fuel metering valve 32 according to the spool position thereof. The metered fuel is supplied to the fuel nozzles 28 through a shutoff valve 104, a drain valve 106 and a shutoff mechanism 108. The ECU 80 calculates the command value Wf indicating the flow rate of fuel to be supplied to the engine 10 at 40 msec intervals. The calculated command value Wf is used to control the supply of fuel so as to achieve the fuel flow rate calculated by the FCU 30.

An emergency stop switch 110 is connected to the low-pressure turbine shaft 42a. If the low-pressure turbine shaft 42a should be displaced for some reason, the emergency stop switch 110 will turn on to operate the shutoff mechanism 108 and mechanically block supply of fuel to the fuel nozzles 28. In addition, a solenoid 112 is provided in association with the shutoff valve 104. The solenoid 112 is responsive to the pilot-selected command 90 for operating the shutoff valve 104 to block supply of fuel to the fuel nozzles 28.

Figure 3:
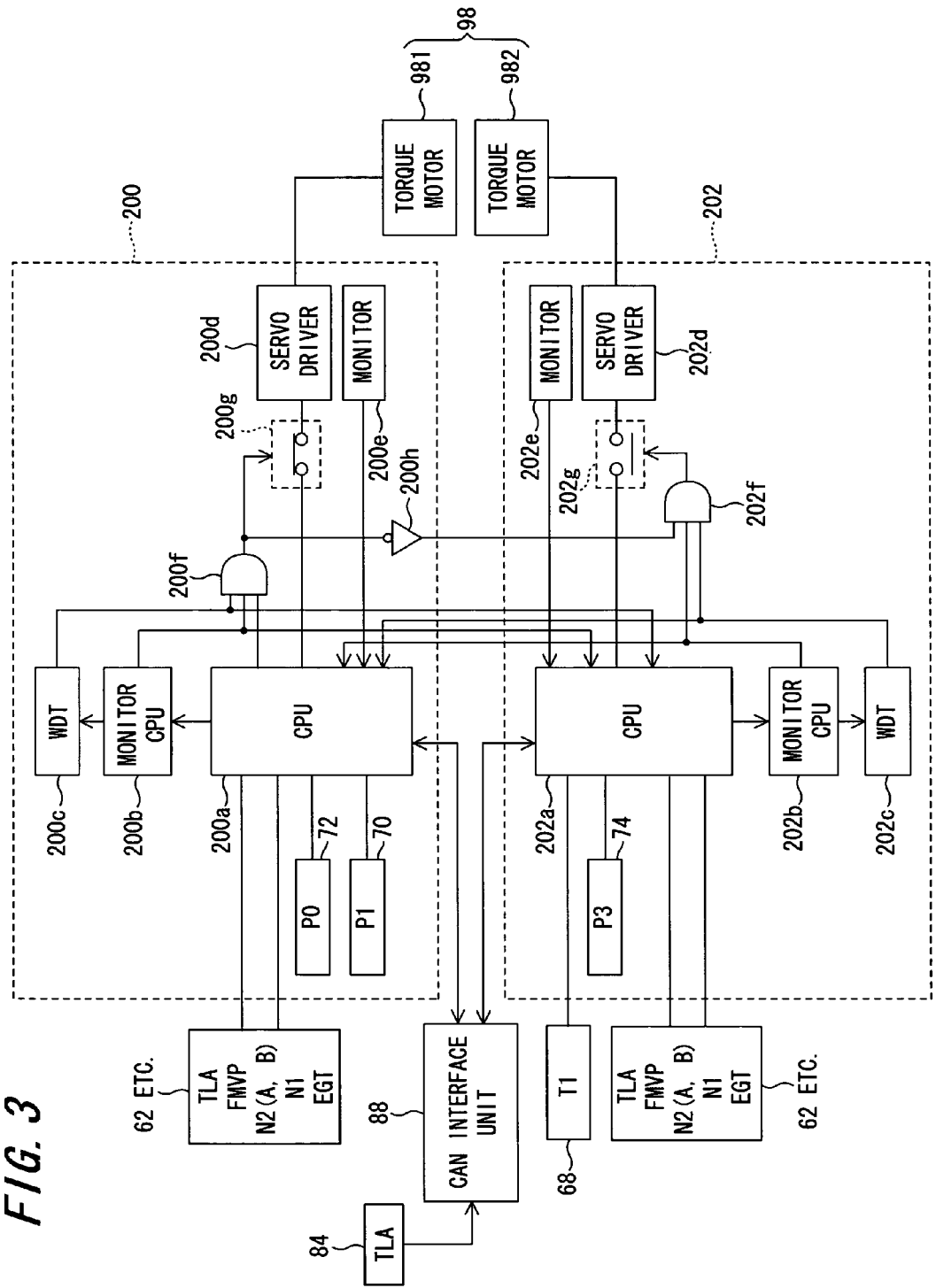
FIG. 3 is a block diagram showing the physical components constituting the ECU and FCU of FIG. 2.

FIG. 3 is a block diagram showing the physical components constituting the ECU 80 and FCU 30.

Because the engine 10 is a gas-turbine aeroengine, the ECU 80 and FCU 30 are composed of a primary lane (first control channel or system) 200 and a secondary lane (secondary control channel or system) 202, respectively equipped with a CPU 200a and CPU 202a for conducting the aforesaid operations, a monitor CPU 200b and monitor CPU 202b for monitoring the operation of the CPU 200a and CPU 202a, and WDTs (watchdog timers) 200c and 202c for monitoring the operation of the monitor CPUs. When it is monitored to detect that an abnormal condition has arisen in the lane 200, the lane 202 conducts fuel supply control in place of the lane 200.

The two CPUs 200a and 202a operate as the ECU 80 and FCU 30. That is, they use the outputs of the sensors (shown there) to calculate the energizing current command value for supply to the torque motor 98 and forward the calculated value through servo drivers 200d, 202d (not shown in FIG. 2) to the torque motor 98. (The operation of the servo drivers 200d, 202d is monitored by monitors (monitor circuits) 200e, 202e.) As is clear from FIG. 3, the torque motor 98 actually comprises two torque motors, one designated 981 (for the primary lane 200) and the other designated 982 (for the secondary lane 202). So long as the CPU 200a of the primary lane 200 operates normally, only the primary lane output is sent to the torque motor 98 (the torque motor 981).

Moreover, two or more of many of the aforesaid various sensors are also provided. As shown, three TLA sensors 84 are provided, and their outputs are inputted to the two lanes 200, 202. Two each of the N1 sensor 62, the EGT sensor 76, and the FMVP sensor (not shown in FIG. 2) are provided, and their outputs are inputted to the two lanes 200, 202. Further, four N2 sensors 64 are provided, two (designated A and B) for each lane. The outputs of the sensors A and B of each pair are inputted to the associated lane 200, 202.

The N2 sensors 64 are made of magnetic pickups. Four of the same structure are installed near the shaft 56 with proximity to each other. The N1 sensors 62 are also made of magnetic pickups of the same structure. Two are installed near the low-pressure turbine shaft 42a. Also in case of each of the other sensors, a plurality of sensors of the same structure are installed. Sensors of the same type are configured to produce identical outputs.

The outputs of the P1 sensor 70 and P0 sensor 72 are inputted to the lane 200, and the outputs of the P3 sensors 74 are inputted to only the lane 202. The reason for inputting the outputs of these sensors only to one or the other of the two lanes 200, 202 is that they are less significant than the outputs of the N1 sensors 62, N2 sensors 64 and other sensors that detect turbine speed.

Next, the operation of discriminating transient/steady-state operating condition and the operations for determining signal output acceptability among of the operations performed by the ECU 80 will now be explained.

Figure 4:
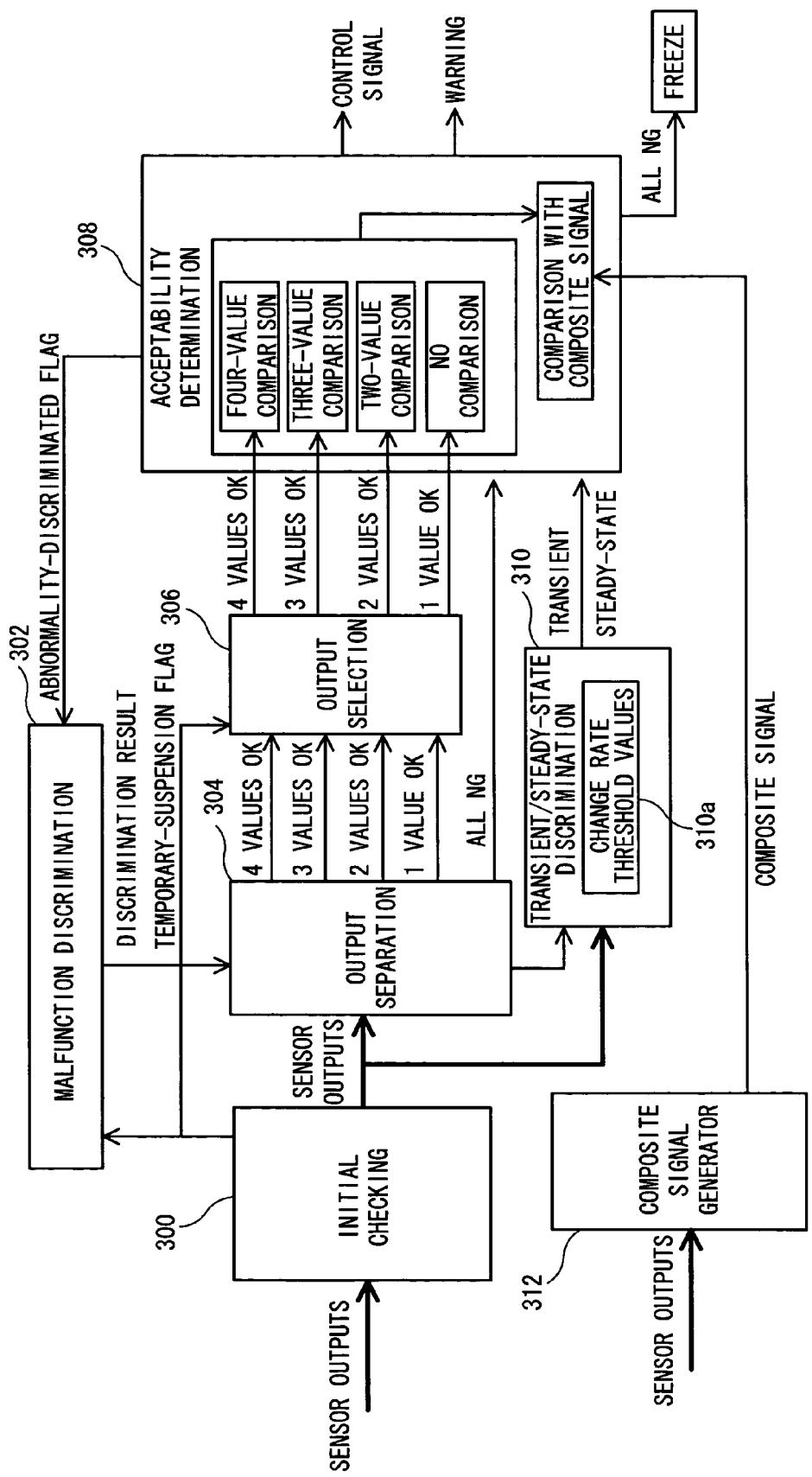
FIG. 4 is a block diagram comprising functional blocks representing those of the operations of the ECU of FIG. 2 involved in discriminating transient/steady-state operating condition and determining sensor output acceptability.

FIG. 4 is a block diagram illustrating these operations. Basically, the drawing comprises functional blocks representing the operations performed by the ECU 80, specifically the operations performed in parallel by the CPUs 200a, 202a among the four CPUs discussed in the foregoing.

The aforesaid sensor outputs indicating the operating condition of the engine 10 (i.e., the outputted values) are first sent to a low-pass filter (not shown) for removal of noise components. Then, after being subjected to waveform shaping, they are sent to a counter or the like for conversion to parameters indicating the operating condition (e.g., conversion of the outputs of the N1 sensors 62 to rpm equivalent values), and forwarded to an initial checking block (determiner) 300 once every 10 msec for checking or determining whether they are within suitably determined permissible ranges. The cutoff frequency of the low-pass filter is set or defined in accordance with the sensor outputs so as to remove noise components of the sensor outputs as much as possible, thus removing noise components superimposed on the sensor outputs.

The sensor outputs include the outputs of all of the foresaid sensors, including the outputs of the N1 sensors 62 indicative of the low-pressure turbine speed and the outputs of the N2 sensors 64 indicative of the high-pressure turbine speed. At least two of each type of sensor are provided. The outputs of the four N2 sensors 64, two for each of the lanes 200 and 202, are processed as explained in the following.

The output of the initial checking block 300 is successively sent to a malfunction discrimination block 302, where the number of times that the successively-sent outputs are found to be outside the permissible ranges is counted and it is discriminated whether the sensor (corresponding thereto) is faulty.

The output of the malfunction discrimination block 302 is sent to an output separation block 304. The output of the initial checking block 300 is also sent to the output separation block 304 unmodified. The output separation block 304 operates based on the discrimination result of the malfunction discrimination block 302 to separates or divide those of the inputted sensor outputs that have not been found to be faulty into values for the respective types and then output them. Any sensor output that the initial checking block 300 refrained from determining, the initial checking block 300 outputs it by attaching it with a temporary-suspension flag.

In FIG. 4, "4 values OK" signifies that all four of the N2 sensors 64 have been found to be normal, "3 values OK" signifies that three of the four of the N2 sensors 64 have been found to be normal, "2 values OK" signifies that two of the four N2 sensors 64 have been found to be normal, and "1 value OK" signifies that one of the four N2 sensors 64 has been found to be normal. "All NG" signifies that all outputs of the N2 sensors 64 have been found to be faulty (NG means no good).

The TLA sensors 84 and other sensors are treated similarly, so that "3 values OK" signifies that all outputs of a sensor type having three outputs, such as the TLA sensors, have been found to be normal, "2 values OK" signifies that two outputs among three outputs have been found to be normal and that both of the two outputs of the N1 sensors 62 have been found to be normal, and "1 value OK" signifies that one output of the two outputs of the N1 sensor 62 has been found to be normal. "All NG" again signifies that all outputs of the sensors of the type concerned have been found to be faulty.

The output of the output separation block 304 is sent to an output selection block 306. Any sensor output that the initial checking block 300 refrained from determining and forwarded attached with the temporary-suspension flag is also sent to the output selection block 306. The output selection block 306, on the one hand, eliminates sensor outputs on which determination has not been passed and, on the other hand, selects the signals to be compared, whereafter it sends them to an acceptability determination block (three-value comparator and four-value comparator) 308, which compares outputs of the same type with each other(s) to determine whether they are within a range that allows them to be considered identical, thereby discriminating whether they are sensor outputs usable for fuel supply control.

The "comparison" referred to in the acceptability determination block 308 will be explained. When only one value is inputted, there is no value to compare with each other and the value is outputted as a control signal without modification. Since only a single control signal is outputted in this case, one of the lanes 200, 202 refers to the signal input to the other lane.

When two values are to be compared, specifically, discrimination is made as to whether they both fall in a range that allows them to be considered identical. When they are within such a range of permissibility, two signals are outputted as control signals, one to each of the lanes 200, 202.

Similar ranges are also established for the other parameters but will not be explained here in detail. The ranges are established using different values depending on whether the operating condition of the engine 10 is in transient or steady state. One or the other is therefore selected based on the operating condition discrimination result explained later. The ranges are also used in the three-value comparison and the four-value comparison discussed next.

Figure 5:
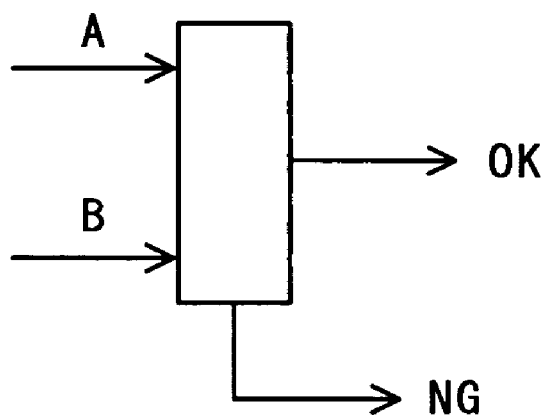
FIG. 5 is a block diagram showing three-value comparison conducted in the acceptability determination block of FIG. 4.
Figure 5:
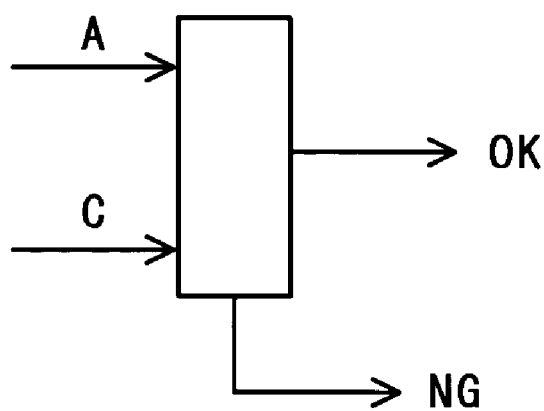
Figure 5:
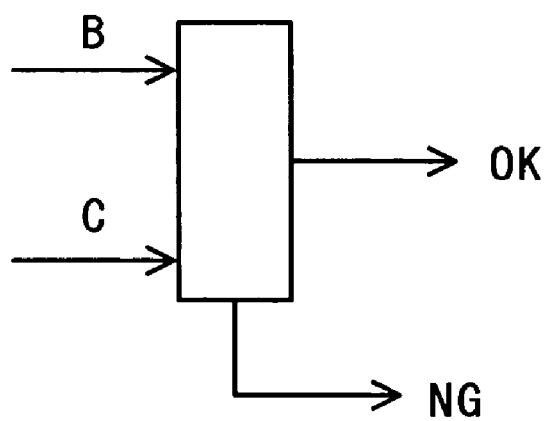

In three-value comparison, two-value comparison is done three times as shown in FIG. 5. The comparison result is determined as shown in FIG. 6 and used as the basis for selecting a signal usable as the control signal and also for determining signal abnormality. Referring to FIG. 3 by way of example, "A" is the sensor output received by the lane concerned, "B" is the sensor output received by the other lane, and "C" is the sensor output that is inputted through the CAN communications system. The assigned symbols (A, B and C) indicate priority (i.e., A is superior to B; B is superior to C). Thus, when the determination is the same for all sensor signals, A is used as the control signal.

As shown in FIG. 6, discrimination is made in accordance with the illustrated logic based on the comparison results. Case 1 is when no abnormal signal has been found, Case 2 is when one abnormal signal has been found, and Case 3 is when all signals have been found to be abnormal. In Case 3, all of the sensor outputs are discriminated to be abnormal and when one of them is in use as the control signal, it is fixed (frozen) at its value and maintained in use, and a warning is issued. In Case 1 whose "A" is followed by an encircled 2, "A" is determined to be probably most reliable because some probability of malfunction occurrence is present for "B" and "C" though very slight.

Figure 7:
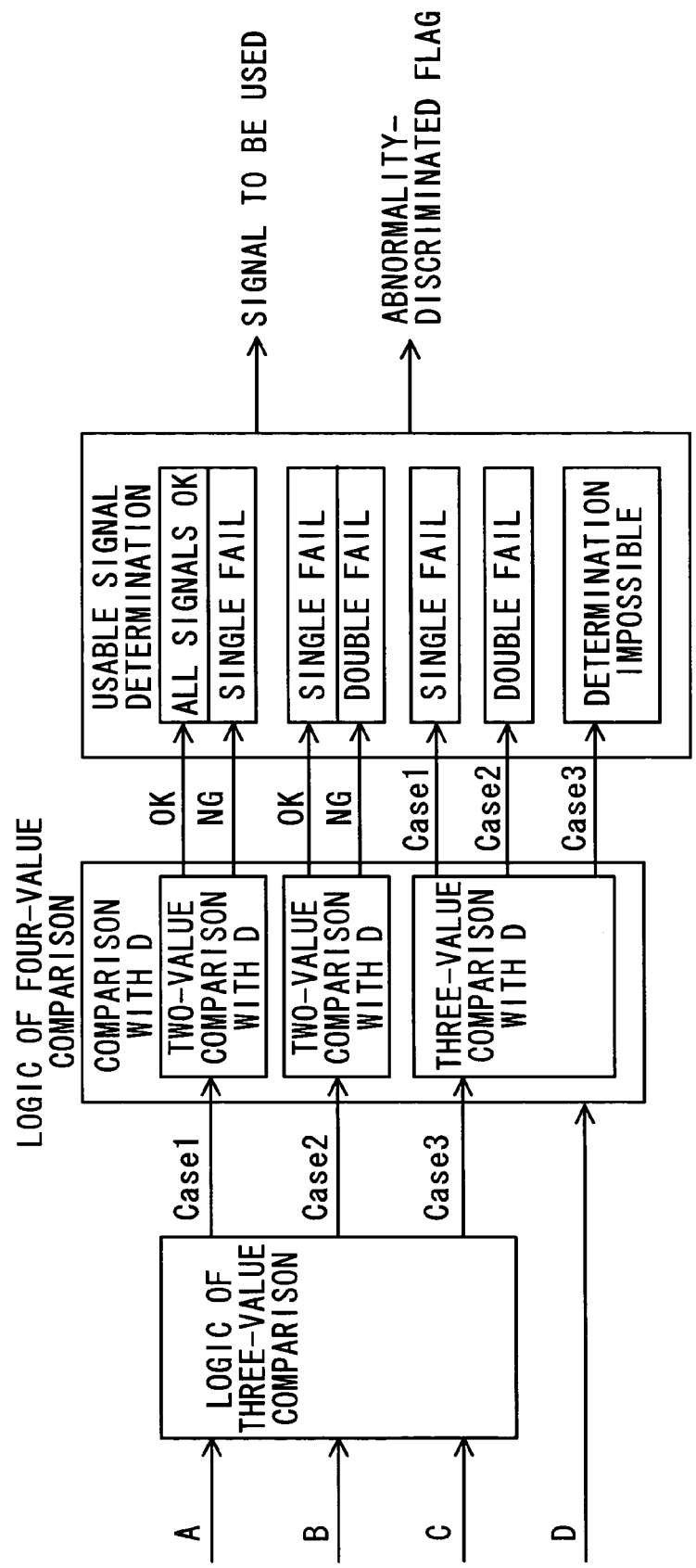
FIG. 7 is a block diagram showing four-value comparison conducted in the acceptability determination block of FIG. 4.

As shown in FIG. 7, four-value comparison is done by conducting two-value comparison three times using three of the four values and then comparing the signals (sensor outputs) found normal with the fourth value. Since the sensor having four outputs is only the N2 sensor 64, "A" is the output of the N2 sensor A received by the lane concerned, "B" is the output of the N2 sensor A received by the other lane, "C" is the N2 sensor B received by the lane concerned and "D" is the output of the N2 sensor B received by the other lane. As mentioned above, the assigned symbols (A, B, C and D) indicate priority. Therefore, three-value comparison is performed on "A", "B" and "C" of higher priority in the order mentioned and when all are found to be normal (Case 1), or when one of the three values is found to be an abnormal signal (Case 2), two-value comparison is performed between these and "D", whose priority is the lowest. Aside from the point that no warning is issued, the three-value comparison itself does not differ from that shown in FIG. 6.

As shown in FIG. 7, when the three-value comparison result is Case 1, the result of the two-value comparison with "D" is either that the four outputs are normal (All Signals Normal) or that "D" is abnormal (Single Fail). When the three-value comparison result is Case 2, the result of the two-value comparison with "D" is either that one of the four outputs is abnormal (Single Fail) or that "D" and one other output are abnormal (Double Fail).

Figure 8:
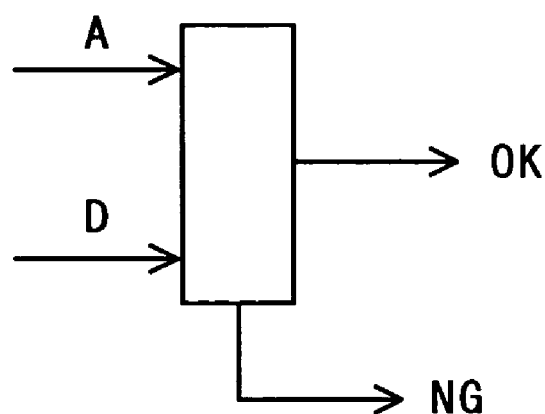
FIG. 8 is a block diagram showing comparison with a remaining value when the three values in the four-value comparison of FIG. 7 is abnormal.
Figure 8:
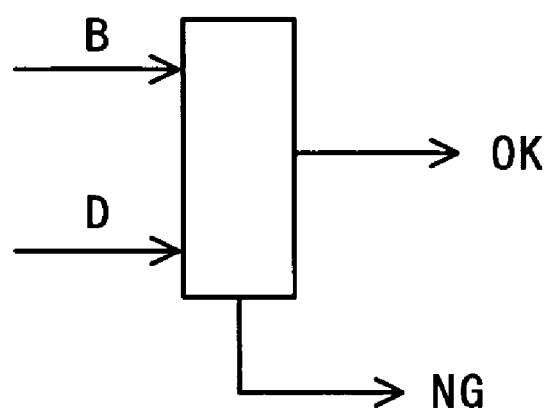
Figure 8:
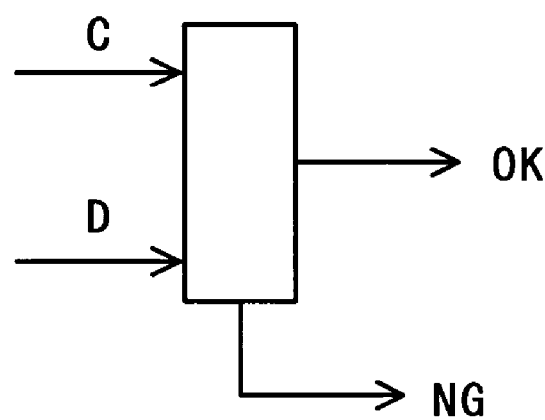

When the three-value comparison result is Case 3, three-value comparison with "D" is performed and, if possible, the signal to be used is selected. The comparison logic for this is shown in FIG. 8 and acceptability determination based on the comparison result is shown in FIG. 9. Case 1 and Case 2 in FIG. 9 indicate cases in which selection of the signal to be used is made by re-comparison with "D". As shown, the re-comparison with "D" sometimes results in selection as the signal to be used of one of the "A", "B" and "C" signals that has once been found abnormal. In Case 3 of FIG. 9, similarly to in Case 3 of FIG. 6, all of the sensor outputs are discriminated to be abnormal, and when one of them is in use as the control signal, it is fixed (frozen) at its value and maintained in use, and the warning is issued.

The explanation of FIG. 4 will be continued. The output of the initial checking block 300 is sent to a transient/steady-state discrimination block (range changer) 310 which discriminates the operating condition of the engine 10.

Figure 10:
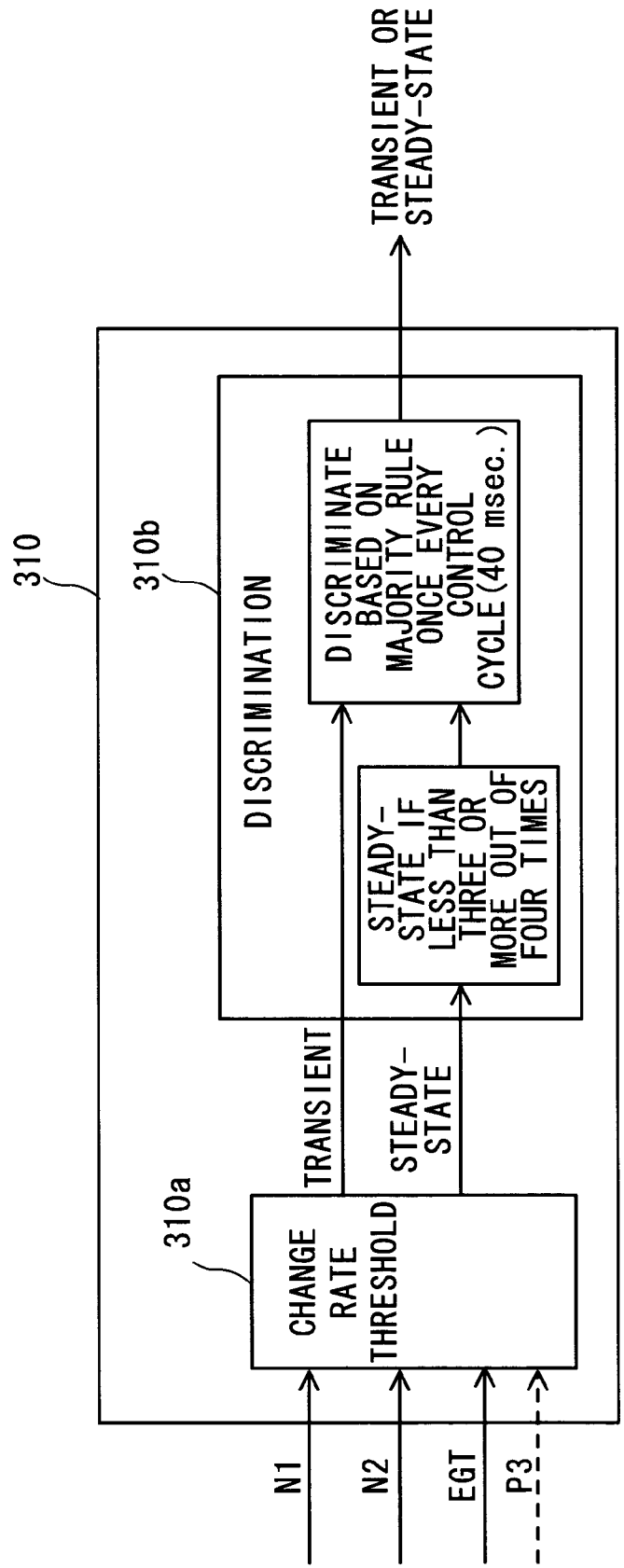
FIG. 10 is a block diagram showing in detail the configuration of the transient/steady-state discrimination block of FIG. 4.

FIG. 10 is a block diagram showing in detail the configuration of the transient/steady-state discrimination block 310.

As shown in this drawing, the sensor outputs (parameters) used in the transient/steady-state discrimination are one each of the outputs of the N1 sensors 62, the two (A and B) N2 sensors 64 and EGT sensors 76 and the outputs of the P3 sensors 74. (Specifically, the high-priority outputs "A" are used insofar as they are found to be normal.) Specifically, the discrimination of the primary lane 200 is done using the four sensor outputs N1, N2A, N2B and EGT, while the discrimination of the secondary lane 202 is done using five sensor outputs, namely, the aforesaid four sensor outputs plus output P3. The reason for including P3 among the parameters for discrimination in the secondary lane 202 is that the discrimination in the secondary lane 202 needs to be conducted with greater care because the lane 202 is a secondary lane subjected to fuel supply control in place of the primary lane 200 when a malfunction has occurred in the primary lane 200.

The four or five outputs are sent to a change rate threshold block (comparator) 310a once every 10 msec (predetermined time period) to be compared with change rate threshold values predefined for the individual sensors.

As shown in FIG. 10, the change rate threshold block 310a forwards the results of comparing the inputted values with the corresponding threshold values to a discrimination block 310b. The discrimination block 310b uses the comparison results to discriminate the operating condition once every 40 msec. Basically, the discrimination is made based on the majority rule. Specifically, in the case of the primary lane 200, the engine 10 is discriminated to be in transient state when two or more (half or more) of the four values are equal to or greater than the corresponding threshold values and is discriminated to be in steady state when two or more of the four values are found to be smaller than the corresponding threshold values three consecutive times or three out of four times. The comparison is made between the inputted values and the threshold values once every 10 msec, so that comparison is made four times within a period of 40 msec. When the number becomes the same between two like values among the four values, one of the N2 sensor 64 outputs is eliminated and the remaining three values are compared with each others such that the discrimination result is in the majority is generated.

In the case of the secondary lane 202, the engine 10 is discriminated to be in transient state when three or more of the five values are equal to or greater than the corresponding threshold values. On the other hand, the engine 10 is discriminated to be in steady state when three or more of the five values are found to be smaller than the corresponding threshold values three consecutive times or three times out of four times.

In discrimination of the lanes 200 and 202 using TLA, the engine 10 is found to be in transient state when two or more of three values are equal to or greater than the corresponding threshold values. On the other hand, the engine 10 is found to be in steady state when two or more of three values are found to be smaller than the corresponding threshold values three consecutive times or three out of four times.

Although discrimination is explained in the foregoing as being made using the change rate of values outputted once every predetermined time period, it is possible to calculate the differences between like values outputted once every predetermined time period and use them as threshold values.

The transient/steady-state discrimination block 310 outputs the discrimination result.

The explanation of FIG. 4 will be continued. The discrimination result of the transient/steady-state discrimination block 310 is sent to the acceptability determination block 308. In accordance with the discrimination result, the acceptability determination block 308 selects and uses one or the other of the ranges for the transient and steady states established beforehand as ranges of permissibility (within which values can be considered identical). It also effects appropriate fuel supply control based on the discrimination result of the transient/steady-state discrimination block 310.

With respect to N1, P3, EGT and the like, a composite signal generator 312 produces a composite signal using values estimated from other parameters and the acceptability determination block 308 again makes an acceptability determination through comparison therewith.

As described above, the embodiment is configured to have a system for controlling a gas-turbine engine having two turbines including at least a low-pressure turbine 42 and a high-pressure turbine 40, comprising: at least one speed sensor (N1 sensor 62) generating an output indicative of a rotational speed of the low-pressure turbine; at least one speed sensor (N2 sensor 64) generating an output indicative of a rotational speed of the high-pressure turbine; a temperature sensor (EGT sensor 76) generating an output indicative of a temperature of exhaust gas exiting the low-pressure turbine; and a first control channel (primary lane 200) inputting the outputs of the sensors and controlling supply of fuel to the engine based on at least one of the inputted outputs; wherein the first control channel includes: a comparator (change rate threshold block 310a) inputting the outputs generated by the sensors and comparing change rates or difference of the outputs with corresponding threshold values once every predetermined time period; and a transient/steady-state discriminator (transient/steady-state discrimination block 310) discriminating that the engine is in a transient state when the number of the outputs found to be equal to or greater than the corresponding threshold values are equal to or greater than a predetermined value, more specifically the two or more of four outputs or three or more of five are equal to or greater than the corresponding threshold values, while discriminating that the engine is in a steady state when the number of times that the outputs are found to be smaller than the corresponding threshold values is more than half of number of comparison time, more specifically three consecutive times or three out of four times. With this, it becomes possible to discriminate whether the engine 10 is in a steady state or in a transient state including acceleration, without being affected by noise or the like.

Further, the system is configured to include a second control channel (secondary lane 202) controlling supply of fuel to the engine, in place of the first control channel when an abnormality condition arises in the first control channel and the second control channel has the transient/steady-state discriminator (transient/steady-state discrimination block 310). With this, in addition to the effect mentioned above, if the discrimination results of the two control channels are different from each other, it becomes possible to estimate that an abnormality has occurred in the sensor outputs and to cope therewith appropriately.

Further, one of the transient/steady-state discriminators (transient/steady-state discrimination block 310) of the first and second control channels, more precisely the second control channel is configured to have a fourth sensor (more specifically the P3 sensor 74). Accordingly, when the P3 sensor 74 that detects the output pressure of the compressor driven by the high-pressure turbine 74 is provided as the fourth sensor, for example, since the change in the operating condition occurs at the high-pressure side earlier than that at the low-pressure side, it becomes possible to discriminate the change in the operating condition with accuracy. Moreover, when the discrimination results in the two control channels are different from each other, since it becomes possible to predict the possibility that surge has occurred, it becomes possible to cope therewith.

Further, each of the first and second control channels includes: an acceptability determiner (acceptability determination block 308) determining whether the outputs generated by the sensors of a same type are within a range that allows the outputs to be considered identical to determine the sensor output that is usable in the fuel supply control; and a range changer (acceptability determination block 308) changing the range based on the determined operating condition. With this, in addition to the effects mentioned above, it becomes possible to determine whether any one of the sensor outputs is usable in the fuel supply control and to conduct the fuel supply control more appropriately.

Further, the embodiment is configured to have a system for controlling a gas-turbine engine having at least one turbine (high-pressure turbine 40), comprising: a first group of two speed sensors (N2 sensors 64) installed at or near the engine and each generating an output indicative of a rotational speed of the turbine; a second group of two speed sensors installed at or near the engine and each generating an output indicative of the rotational speed of the turbine; a first control channel (primary lane 200) inputting the outputs of the first group of speed sensors and controlling supply of fuel to the engine based on the inputted outputs; and a second control channel (secondary lane 202) inputting the outputs of the second group of speed sensors and controlling supply of fuel to the engine based on the inputted outputs, in place of the first control channel when an abnormality condition arises in the first control channel; wherein the first and second control channels include: three-value comparator (acceptability determination block 308) inputting at least four outputs (values) generated by the first and second groups of speed sensors and comparing them with each other to determine whether at least three of the four outputs are within a range that allows the three to be considered identical; and four-value comparator (acceptability determination block 308) inputting a result of comparison at the three-value comparator and comparing the at least three with a remaining one of the four outputs to determine whether the four outputs are within the range that allows the three to be considered identical to the remaining one and determining whether each of the four outputs is the output that is usable in the fuel supply control.

More specifically, the embodiment is configured to have a system for controlling a gas-turbine engine having at least a low-pressure turbine 42 and a high-pressure turbine 40, comprising: a low-pressure turbine speed sensor (N1 sensor 62) generating an output indicative of a rotational speed of the low-pressure turbine 42; two high-pressure turbine speed sensors (N2 sensors 64) installed at or near the engine and each generating an output indicative of a rotational speed of the high-pressure turbine 40; a temperature sensor (EGT sensor 76) generating an output indicative of a temperature of exhaust gas exiting the turbine; a second group of the low-pressure turbine speed sensor, the high-pressure turbine speed sensors and the temperature sensors; a first control channel (primary lane 200) inputting the outputs of the first group of speed sensors and controlling supply of fuel to the engine based on the inputted outputs; and a second control channel (secondary lane 202) inputting the outputs of the second group of sensors and controlling supply of fuel to the engine based on the inputted outputs, in place of the first control channel when an abnormality condition arises in the first control channel; wherein the first and second control channels include: three-value comparator (acceptability determination block 308) inputting at least four outputs generated by the first and second groups of speed sensors and comparing them with each other to determine whether at least three of the four outputs are within a range that allows the three to be considered identical; and four-value comparator (acceptability determination block 308) inputting a result of comparison at the three-value comparator and comparing the at least three with a remaining one of the four outputs to determine whether the four outputs are within the range that allows the three to be considered identical to the remaining one and determining whether each of the four outputs is the output that is usable in the fuel supply control.

With this, through the three-value comparison and four-value comparison, when the high-pressure turbine speed sensor (N2 sensor 64) or the like is installed by plural numbers, it becomes possible to accurately select the sensor outputs that are usable in the fuel supply control, thereby improving the control accuracy.

Further, it is configured such that at least one of the three-value comparator and the four-value comparator determines the output that is not usable in the fuel supply control. With this, in addition to the effects mentioned above, it becomes possible to avoid the abnormal signal from being used in the control, thereby further improving the control accuracy.

Further, it is configured such that the system further includes: a temperature sensor (EGT sensor 76) installed at the engine and generating an output indicative of a temperature of exhaust gas exiting the turbine; a transient/steady-state discriminator (transient/steady-state discrimination block 310) inputting at least the output of the temperature sensor and at least one of the four outputs generated by the first and second groups of speed sensors and comparing at least one of change rates and differences of the outputs with corresponding threshold values once every predetermined time period to determine whether operating condition of the engine is in a transient state or in a steady state; and a range changer (acceptability determination block 308) changing the range based on the determined operating condition.

Further, it is configured such that the system further includes: a transient/steady-state discriminator (transient/steady-state discrimination block 310) inputting the outputs generated by the low-pressure turbine speed sensor (N1 sensor 62), the high-pressure turbine speed sensor (N2 sensor 64) and the temperature sensor (EGT sensor 76) and comparing change rates and differences of the outputs with corresponding threshold values once every predetermined time period to determine whether operating condition of the engine is in a transient state or in a steady state; and a range changer (acceptability determination block 308) changing the range based on the determined operating condition.

Although a turbofan engine has been used as an example of a gas-turbine aeroengine in the foregoing embodiment, the engine can instead be a turbojet engine, turboprop engine, turboshaft engine or the like.

Japanese Patent Application Nos. 2004-106421 filed on Mar. 31, 2004, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A system for controlling a gas-turbine engine having two turbines including at least a low-pressure turbine and a high-pressure turbine, comprising:

at least one speed sensor generating an output indicative of a rotational speed of the low-pressure turbine;

at least one speed sensor generating an output indicative of a rotational speed of the high-pressure turbine;

a temperature sensor generating an output indicative of a temperature of exhaust gas exiting the low-pressure turbine; and a first control channel inputting the outputs of the sensors and controlling supply of fuel to the engine based on at least one of the inputted outputs;

wherein the first control channel includes:

a comparator inputting the outputs generated by the sensors and comparing change rates or difference of the outputs with corresponding threshold values once every predetermined time period; and a transient/steady-state discriminator discriminating that the engine is in a transient state when the number of the outputs found to be equal to or greater than the corresponding threshold values are equal to or greater than a predetermined value, while discriminating that the engine is in a steady state when the number of times that the outputs are found to be smaller than the corresponding threshold values is more than half of number of comparison times.

2. The system according to claim 1, further including:

a second control channel controlling supply of fuel to the engine, in place of the first control channel when an abnormality condition arises in the first control channel;

and the second control channel has the transient/steady-state discriminator.

3. The system according to claim 2, wherein one of the transient/steady-state discriminators of the first and second control channels has a fourth sensor.

4. The system according to claim 2, wherein each of the first and second control channels includes:

an acceptability determiner determining whether the outputs generated by the sensors of a same type are within a range that allows the outputs to be considered identical to determine the sensor output that is usable in the fuel supply control; and a range changer changing the range based on the determined operating condition.

5. A method of controlling a gas-turbine engine having two turbines including at least a low-pressure turbine and a high-pressure turbine, at least one speed sensor generating an output indicative of a rotational speed of the low-pressure turbine, at least one speed sensor generating an output indicative of a rotational speed of the high-pressure turbine, a temperature sensor generating an output indicative of a temperature of exhaust gas exiting the low-pressure turbine, and a first control channel inputting the outputs of the sensors and controlling supply of fuel to the engine based on at least one of the inputted outputs, comprising the steps of:

inputting the outputs generated by the sensors and comparing change rates or difference of the outputs with corresponding threshold values once every predetermined time period; and discriminating that the engine is in a transient state when the number of the outputs found to be equal to or greater than the corresponding threshold values are equal to or greater than a predetermined value, while discriminating that the engine is in a steady state when the number of times that the outputs are found to be smaller than the corresponding threshold values is more than half of number of comparison times.

6. The method according to claim 5, further including:

a second control channel controlling supply of fuel to the engine, in place of the first control channel when an abnormality condition arises in the first control channel;

and the second control channel has the transient/steady-state discriminator.

7. The method according to claim 6, wherein one of the transient/steady-state discriminators of the first and second control channels has a fourth sensor.

8. The method according to claim 6, further including the steps of:

determining whether the outputs generated by the sensors of a same type are within a range that allows the outputs to be considered identical to determine the sensor output that is usable in the fuel supply control; and changing the range based on the determined operating condition.

* * * * *